United States Patent [19]

Mims

[11] Patent Number: 5,167,841
[45] Date of Patent: * Dec. 1, 1992

[54] REMOVING MATERIAL DEBRIS FROM BODY OF WATER

[75] Inventor: Ken Mims, Lake Monroe, Fla.

[73] Assignee: Uddo-Mims-International, Edgewater, Fla.

[ * ] Notice: The portion of the term of this patent subsequent to Nov. 17, 2004 has been disclaimed.

[21] Appl. No.: 699,218

[22] Filed: May 13, 1991

Related U.S. Application Data

[63] Continuation-in-part of Ser. No. 563,813, Aug. 3, 1990, abandoned, which is a continuation of Ser. No. 433,465, Nov. 8, 1989, abandoned, which is a continuation of Ser. No. 316,933, Feb. 27, 1989, abandoned, which is a continuation of Ser. No. 110,111, Oct. 19, 1987, Pat. No. 4,818,419, which is a continuation-in-part of Ser. No. 714,034, Mar. 20, 1985, Pat. No. 4,707,277.

[51] Int. Cl.$^5$ .............................................. B01D 21/02
[52] U.S. Cl. ................... 210/805; 210/806; 210/241; 210/416.1; 210/525
[58] Field of Search ............... 210/767, 780, 805, 241, 210/242.1, 194, 242.2, 374, 379, 382, 416.1, 416.2, 629, 416.3, 525, 526, 314, 806, 170, 532.2; 137/264, 267; 209/12, 421, 351; 15/340; 280/5.22; 141/231

[56] References Cited

U.S. PATENT DOCUMENTS

| | | | |
|---|---|---|---|
| 2,010,538 | 8/1935 | Evans | 210/241 |
| 2,964,191 | 12/1960 | Arnold et al. | 210/241 |
| 3,842,461 | 10/1974 | Wurster | 15/340 |
| 4,040,864 | 8/1977 | Steeves | 210/242.1 |
| 4,046,689 | 9/1977 | Argyll | 210/241 |
| 4,134,174 | 1/1979 | Flynn et al. | 15/340 |
| 4,152,800 | 5/1979 | Nilsmar | 210/242.1 |
| 4,199,837 | 4/1980 | Fisco, Jr. | 15/340 |
| 4,213,479 | 7/1980 | Pearson | 137/351 |
| 4,227,893 | 10/1980 | Shaddock | 55/343 |
| 4,234,980 | 11/1980 | DiVito et al. | 15/340 |
| 4,306,967 | 12/1981 | Trautwein | 210/241 |
| 4,312,762 | 1/1982 | Blackburn et al. | 210/241 |
| 4,348,136 | 9/1982 | Donovan | 405/66 |
| 4,377,475 | 3/1983 | Wiedemann | 219/241 |
| 4,404,101 | 9/1983 | Koch et al. | 210/241 |
| 4,490,162 | 12/1984 | Davis | 15/340 |
| 4,525,277 | 6/1985 | Poulin | 210/241 |
| 4,707,277 | 11/1987 | Mins | 210/805 |
| 4,818,419 | 4/1989 | Mins | 210/796 |

FOREIGN PATENT DOCUMENTS

| | | | |
|---|---|---|---|
| 1584914 | 11/1969 | Fed. Rep. of Germany | 210/270 |
| 2414563 | 10/1975 | Fed. Rep. of Germany | 210/270 |
| 2800628 | 7/1979 | Fed. Rep. of Germany | 210/270 |

*Primary Examiner*—Robert A. Dawson
*Assistant Examiner*—W.L. Millard
*Attorney, Agent, or Firm*—Frijouf, Rust & Pyle

[57] ABSTRACT

An apparatus and method is disclosed for an apparatus for removing granular material and debris from a basin of a body of water. The apparatus comprises a first pump having an input port for collecting granular material, debris and water from of the basin. A conduit conducts the removed granular material, debris and water from the basin to a mobile reservoir. An Archimedean screw conveyor extends angularly relative to the mobile reservoir for conveying the granular material, debris and water away from the mobile reservoir and for separating the granular material and debris from the water. A second pump discharges the water from the mobile reservoir back into the basin.

20 Claims, 2 Drawing Sheets

REMOVING MATERIAL DEBRIS FROM BODY OF WATER

CROSS-REFERENCE TO RELATED APPLICATIONS

This application is a continuation-in-part of application Ser. No. 563,813 filed Aug. 3, 1990 (now abandoned) which is a continuation of application Ser. No. 433,465 filed Nov. 8, 1989, now abandoned. Application Ser. No. 443,465 filed Nov. 8, 1989 is a continuation of application Ser. No. 316,933 filed Feb. 27, 1989, now abandoned. Application Ser. No. 316,933 filed Feb. 27, 1989 is a continuation of application Ser. No. 110,111 filed Oct. 19, 1987, now U.S. Pat. 4,818,419. Application Ser. No. 110,111 filed Oct. 19, 1987 is a continuation-in-part of application Ser. No. 714,034 filed Mar. 20, 1985, now U.S. Pat. No. 4,707,277. All subject matter of application 563,813 filed Aug. 3, 1990 now abandoned, application Ser. No. 433,465 filed Nov. 8, 1989 (now abandoned), application Ser. No. 316,933 filed Feb. 27, 1989, application Ser. No. 110,111 filed Oct. 19, 1987, and application Ser. No. 714,034 filed Mar. 20, 1985 is incorporated by reference as if fully set forth herein.

BACKGROUND OF THE INVENTION

1. Field Of The Invention

This invention relates to a method and an apparatus for removing granular material and debris from a basin of a body of water. More specifically, this invention relates to an apparatus and a method for removing sand and debris from navigable channels, water retention ponds and other bodies of water.

2. Information Disclosure Statement

The present invention is applicable to navigable channels, lakes, water retention ponds and other bodies of water which, over time, tend to accumulate a buildup of sand or other material, and which therefore require periodic dredging.

Under current methods, dredging is accomplished by pumping a slurry of the sand and other debris along with some water to another location, known as a "spoil bank". As the slurry slows at the spoil bank, the sand and other debris settle out, and the bank is formed. Such a procedure requires a relatively large area which is nearby and available for use as a spoil bank.

One of the problems with this method is that governmental authorities require that a permit be obtained before depositing material in such a spoil bank. Because of environmental concerns, these permits can be difficult to obtain. Indeed, it is sometimes possible to obtain a permit to dredge but be unable to obtain a permit to deposit the dredged material in a spoil bank.

Another difficulty with the current dredging procedure is the frequent absence of a location to allow the dredged material to settle. Water retention ponds and navigable channels are often located in densely populated areas. Such areas may offer no vacant land or aquatic areas to dump the spoil.

The present invention overcomes the aforementioned inadequacies of the prior art by the provision of a mobile reservoir into which the dredged material is deposited, and a separation means for separating the sand and debris from the water. The device incorporates a pump disposed within the basin from which the granular material and debris is to be removed. The pump pumps the granular material, debris and a portion of the water such that an aqueous slurry is formed and flows from the basin to the mobile reservoir. When the slurry of granular material and debris enters the reservoir, the granular material and debris settle to the bottom of the reservoir. The settled granular material and debris is conveyed by the separation means for separating the granular material from the water. The device also incorporates means for transporting the water from the mobile reservoir back to the basin, and means for collecting the separated granular material and debris from the separation means, and removing the separated granular material and debris from the site.

Therefore, it is an object of the present invention to provide an apparatus and a method to remove granular material and debris from an aqueous slurry without the need for a settling area or "spoil bank".

Another object of the present invention is to provide an apparatus and a method to remove granular material and debris utilizing a mobile reservoir means and separation means.

Another object of the present invention is to provide an apparatus and a method which may be completely self contained, mobile and which enables an operating crew to remove the granular material and debris from the basin quickly and efficiently, without the need for time-consuming set-up.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full under standing of the invention may be had by referring to the summary of the invention, the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention relates to an improved apparatus and method for removing granular material and debris from a basin of a body of water.

The apparatus comprises a first pump means having an input port and an output port, the input port for collecting the granular material and debris from of the basin together with a portion of the water contained within the basin. Preferably, the first pump means is a self-priming submersible pump driven by compressed air or hydraulic fluid.

A positioning means has a first end and a second end. The first end of the positioning means is secured to the first pump means for positioning the first pump means within the basin adjacent to the granular material and debris to be removed. Preferably, the second end of the positioning means is adjustably mounted on a float means, floating on the surface of the water.

A conduit means is preferably in fluid tight communication with the output port of the first pump means. The conduit means conducts the removed granular material, debris and water from the first pump means away from the basin. Preferably, the conduit means is buoyant.

Mobile reservoir means include an inlet and an outlet. The inlet of the mobile reservoir means is connected to the conduit means preferably in fluid tight communication, for receiving the slurry of granular material and debris.

Preferably, the mobile reservoir means defines a chamber having opposed sloping sidewalls which slope toward each other from the inlet to the outlet such that as the slurry of granular material and debris enters the mobile reservoir means through the inlet, turbulent energy of the slurry of granular material and debris is rapidly dissipated permitting the granular material and debris to settle toward the outlet.

Preferably, the mobile reservoir means further includes weir means which extend into the chamber for limiting the level of the slurry within the chamber. An accumulator means disposed between the weir means and a discharge means accumulates the water without the granular material and debris. The accumulator means has an entry port and an exit port. The entry port is connected to the weir means for receiving the slurry from the weir means into the accumulator means. A first flexible pipe extends between the exit port of the accumulator means and the discharge means, and a second flexible pipe extends from the discharge means to the basin.

Preferably, the mobile reservoir means includes a mobile turntable mounted on a truck for permitting the mobile reservoir means to be rotated within a substantially horizontal plane, and a pivotal means disposed between the mobile turntable and the mobile reservoir means for selectively positioning the mobile reservoir means angularly relative to the mobile turntable.

Separation means includes a first and a second opening. The first opening of the separation means is disposed adjacent to and in fluid communication with the outlet of the mobile reservoir means. The separation means extends angularly relative to the mobile reservoir means such that when the separation means is operated, the granular material, debris and water are conveyed away from the first opening toward the second opening, and the water drains back toward the first opening.

Preferably, the separation means is an Archimedean screw conveyor having a first and a second opening. The first opening of the conveyor is disposed adjacent to and in fluid communication with the outlet of the mobile reservoir means. The conveyor extends angularly relative to the mobile reservoir means.

In a more specific embodiment of the invention, the separation means is an Archimedean screw conveyor for separating the granular material and debris from the slurry of granular material, debris and water, and further includes an elongate housing defining a first and a second opening. The housing extends angularly relative to the mobile reservoir means and is disposed, preferably, at an angle of substantially 18 degrees to the horizontal. An elongate axle is rotatably supported by and extends through and alone the length of the housing with the axle having a first and a second end. The first end of the axle is disposed adjacent to the outlet of the mobile reservoir means. A spiral conveyor means is rigidly secured to the axle. The spiral conveyor means is disposed within the housing and extends between the first and the second opening of the housing such that when the axle and spiral conveyor means rotate within the housing, granular material, debris and water are conveyed upwardly along the housing from the first opening toward the second opening for discharge therefrom. The granular material and debris continue upwardly until discharged from the second opening. The granular material and debris separate from the water, and the water flows downwardly along the housing toward the first opening.

The discharge means discharges the water from the mobile reservoir means back into the basin, and preferably comprises a second pump in fluid communication with the mobile reservoir means.

The method for removing granular material and debris from a basin of a body of water comprises the steps of connecting a conduit means in fluid tight communication with an output port of a first pump means. The conduit means is also connected to a mobile reservoir means. An input port of the first pump means is positioned proximate the granular material and debris within the basin for collecting the granular material, debris and a portion of the water contained within the basin.

The granular material, debris and the portion of water are pumped from the basin by the first pump means such that a slurry of granular material and debris is formed and flows from the basin through the first pump means and conduit toward the mobile reservoir means. The granular material and debris settles out within the mobile reservoir means toward an outlet of the mobile reservoir means.

The granular material and debris is separated from the water by conveying the granular material and debris by separation means extending angularly relative to the mobile reservoir means thereby permitting the granular material and debris to be conveyed away from the first opening of the separation means toward a second opening of the separation means, such that the water drains back toward the first opening and the granular material and debris is separated from the water and conveyed toward the second opening for discharge therefrom.

Preferably, the settled granular material and debris is separated from the water by the Archimedean screw separation conveyor or, most preferably, by the Archimedean screw conveyor which conveys the granular material and debris material angularly relative to the mobile reservoir means at an angle of substantially 18 degrees to the horizontal.

The granular material and debris is discharged from the second opening of the separation means. The granular material and debris is transported from the site. The water is discharged from the mobile reservoir means back into the basin, preferably by a second pump means.

The foregoing has outlined rather broadly the more pertinent and important features of the present invention in order that the detailed description that follows may be better understood so that the present contribution to the art can be more fully appreciated. Additionally, features of the invention will be described hereinafter which form the subject of the claims of the invention. It should be appreciated by those skilled in the art that the conception of the specific embodiment disclosed may be readily utilized as a basis for modifying or designing other apparatus for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention reference should be had to the accompanying drawings in which.

Similar reference characters refer to similar parts throughout the several views of the drawings.

DETAILED DISCUSSION

Figure 1:
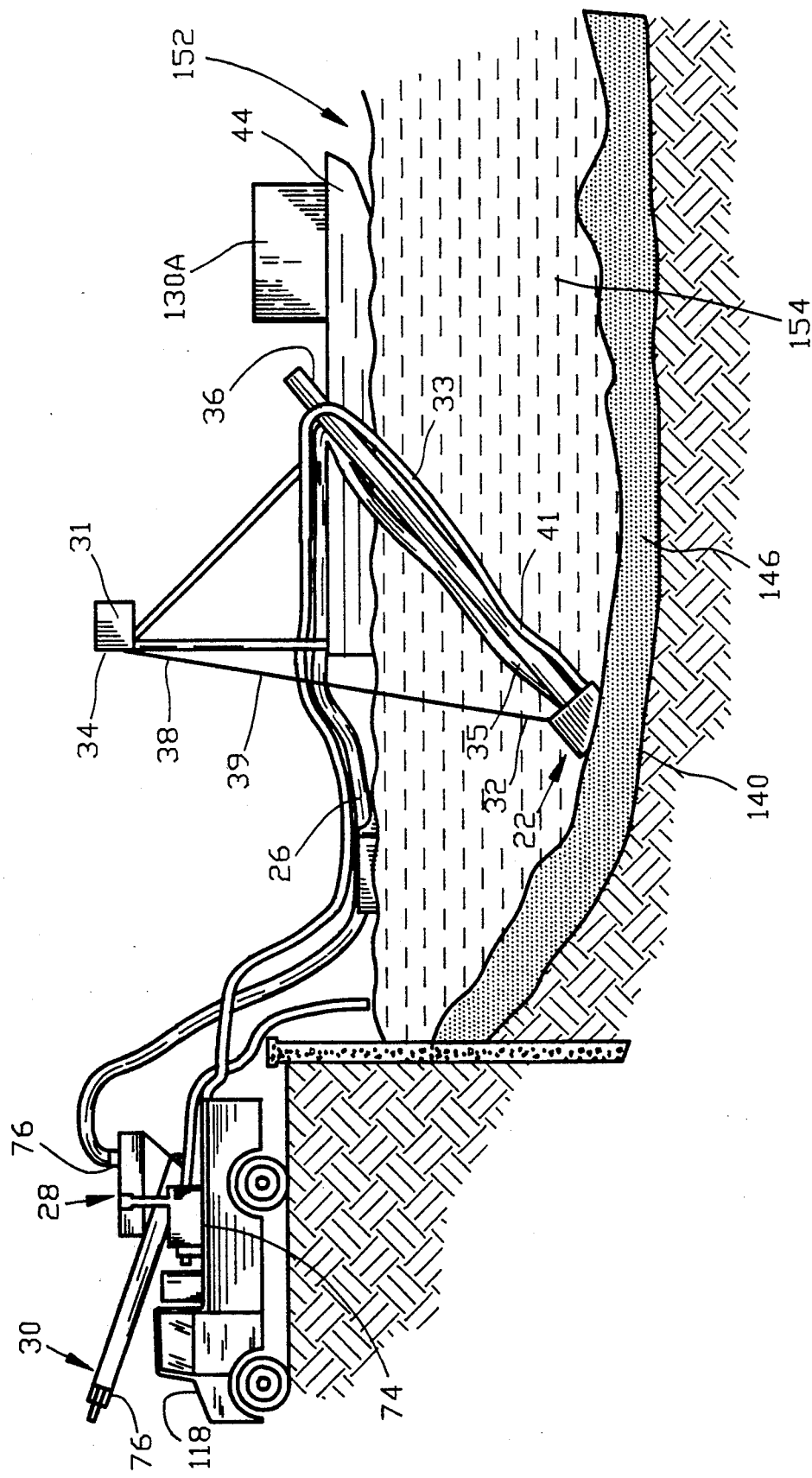
FIG. 1 is a diagrammatic representation of a basin of a body of water and an apparatus for removing granular material and debris from the basin according to the present invention.

FIG. 1 is a diagrammatic representation partly in section of an apparatus for removing granular material and debris 146 from a basin 140 of a body of water 154 according to the present invention. The basin 140 contains granular material and debris 146 to be removed from the basin 140.

Figures 2A, 2B:
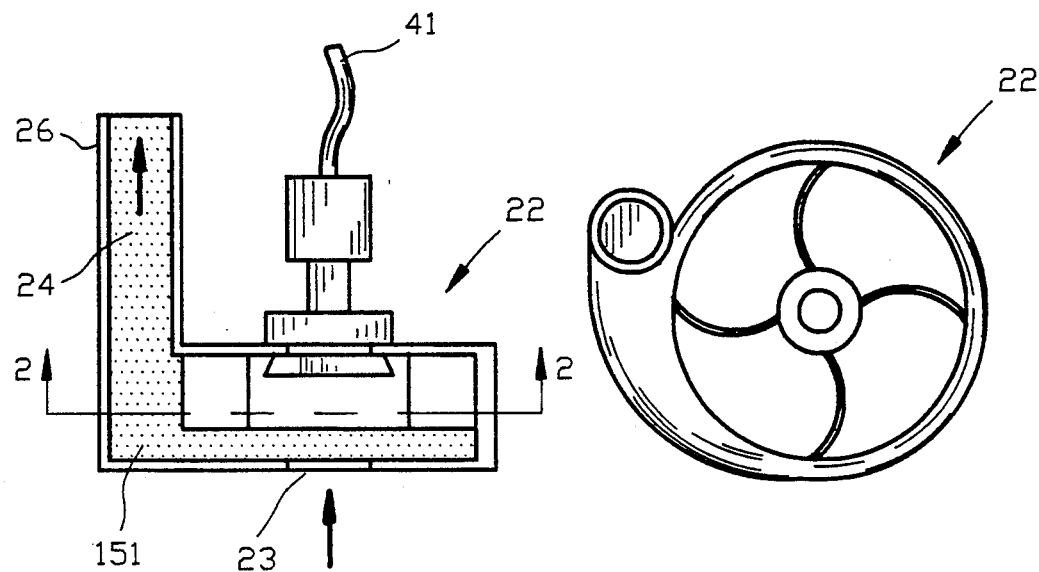
FIG. 2A is a side view of a pump.
FIG. 2B is a top view along lines 2B—2B of FIG. 2A.

FIG. 1, and in greater detail FIG. 2, show the first pump means shown as a self-priming submersible pump 22. The submersible pump 22 has an input port 23 and an output port 24, and is driven preferably by compressed air or hydraulic fluid supplied through hose means shown as a hose 41.

FIG. 1 further discloses float means shown as a boat 44 which floats on the surface of the water 152 contained within the basin 140.

Positioning means is shown as a rigid member 33 having a first end 35 and a second end 36. The first end 35 of the rigid member 33 is secured to the submersible pump 22 so as to permit the selective positioning of the submersible pump 22 within the basin 140. The second end 36 of the rigid member 33 is movably mounted to the boat 44.

Positioning means also comprises height control means is shown as a winch 34 and cable 39. The winch 34 is secured to the boat 44 within a housing 31. The cable 39 has a first end 37 and a second end 38. The first end 37 of the cable 39 is secured to the submersible pump 22 so as to permit the selective control of the depth of the submersible pump 22 within the basin 140. The second end 38 of the cable 39 is secured to the winch 34. It should be appreciated by those skilled in the art, the positioning means comprising the rigid member 33 and the winch 34 and cable 39 may be alternatively mounted on shore.

Conduit means shown as a flexible conduit 26 is attached in fluid tight communication with the output port 24 of the submersible pump 22. In the preferred embodiment of the invention, the flexible conduit 26 is buoyant. The flexible conduit 26 is also attached in fluid tight communication with an inlet 76 of mobile reservoir means shown generally as 28.

Figure 3:
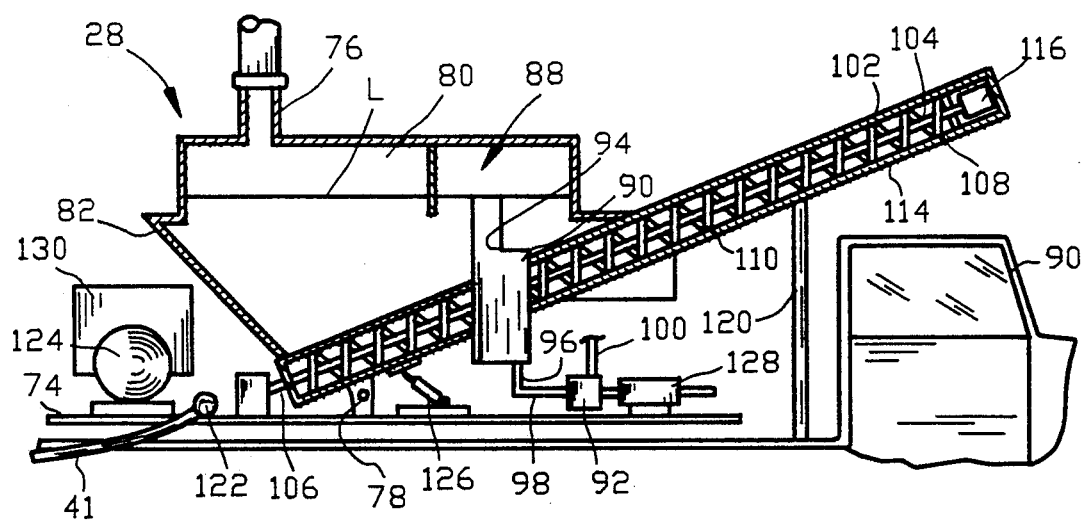
FIG. 3 is an enlarged fragmentary view partially in section of the mobile reservoir means and the separation means shown in FIG. 1.

The mobile reservoir means 28 is preferably mobile and is shown in more detail in FIG. 3. The mobile reservoir means 28 includes a mobile turntable 74 for permitting the mobile reservoir means 28 to be rotated within a substantially horizontal plane. Pivotal means generally designated 78 and a hydraulic piston 126 are disposed between the turntable 74 and the mobile reservoir means 28 such that the mobile reservoir means 28 is selectively positioned angularly relative to the turntable 74.

The mobile reservoir means 28 defines a chamber 80 which includes opposed sloping side walls 82 and 84 respectively which slope toward each other from the inlet 76 to an outlet 86 of the mobile reservoir means 28. The mobile reservoir means has a bottom, shown generally as 29. Weir means, generally designated 88, extend into the chamber 80 for permitting the level L of the contents within the chamber 80 to be limited. An accumulator means 90 is disposed between the weir means 88 and discharge means shown as a second pump 92 for accumulating the water without the settled granular material and debris 149. The second pump 92 is driven by a second motor 128. The accumulator means 90 includes an entry port 94 and an exit port 96. The entry port 94 provides fluid communication between the weir means 88 and the accumulator means 90. A first flexible pipe 98 extends from the exit port 96 of the accumulator means 90 to the second pump 92. A second flexible pipe 100 extends from the second pump 92 to the basin 140.

An outlet 86 of the mobile reservoir means 28 is in fluid communication with a first opening 112 of separation means shown generally as 30.

The separation means 30 is an Archimedean screw conveyor, and includes an elongate housing 102, defining the first opening 112 and a second opening 114. The elongate housing 102 extends angularly relative to the mobile reservoir means 28 at an angle of substantially 18° to the horizontal. An elongate axle 104 is rotatably supported by and extends through and along the length of the elongate housing 102. The axle 104 includes a first end 106 and a second end 108, with the first end 106 of the axle 104 being disposed adjacent to the outlet 86 of the mobile reservoir means 28. A spiral conveyor means 110 is rigidly secured to the elongate axle 104 such that the spiral conveyor means 110 is disposed within the housing 102. The conveyor means 110 extends between the first opening 112 and the second opening 114 of the elongate housing 102. The separation means 30 also includes a hydraulic motor 116 which is drivingly connected to the second end 108 of the axle 104. The hydraulic motor 116 is driven by a hydraulic pump (not shown) which is powered by a first motor 124.

As shown in FIG. 1 and FIG. 3, a truck 118 rotatably supports the separation means 30. FIG. 3 shows support means 120 rigidly secured to the truck 118 for releasably supporting the housing 102 relative to the truck 118.

An air compressor 130 is preferably mounted on the truck 118, and is powered by the first motor 124. An air accumulator 122 is in fluid tight communication with the air compressor 130 for receiving and accumulating the compressed air from the air compressor 130. The hose 41 extends between the air accumulator 122 and the submersible pump 22 for supplying compressed air from the air accumulator 122 to the submersible pump 22. The air compressor 130 and air accumulator 122 may alternatively be mounted on the boat 44, within an air compressor housing 130A. As is appreciated by one skilled in the art, the compressed air system may be substituted by a hydraulic pump system to drive hydraulic motors such as submersible pump 22 and second pump 92.

FIG. 1 illustrates the process of the invention in which the granular material and debris 146 and a portion of the water 154 are removed from the basin 140, and separated by the invention. The granular material and debris 146 is transported away from the site by truck or the like, and the water 154 is pumped by the second pump 92 back into the basin 140.

The truck 118 supporting the mobile reservoir means 28 and separation means 30 is positioned on shore proximate the area of the basin 140 to be dredged. The mobile turntable 74 is rotated within a substantially horizontal plane so as to position the mobile reservoir means 28 such that the inlet 76 of the mobile reservoir means 28 is selectively positioned adjacent to the basin 140 and the second opening 114 of separation means 30 is positioned so as to drop the drained granular material and debris 146 at a desired location such as on the surface of the ground or into the bed of another truck (not shown). Also, the hydraulic piston 126 is operated such that mobile reservoir means 28 and separation means 30 pivot about the pivotal means 78, and are thereby selectively positioned angularly relative to the turntable 74 at an angle of substantially 18° to the horizontal.

The boat 44, floating on the surface of the water, is positioned proximate to the basin 140 to be dredged. The winch 34 is operated, unspooling the cable 39 attached thereto so as to allow the submersible pump 22 mounted on the first end 35 of the rigid member 33 to be lowered into the body of water 154. The submersible pump 22 is thus positioned such that the input port 23 of the submersible pump 22 is positioned proximate the granular material and debris 146 to be removed from the basin 140.

As shown in FIG. 3, the first motor 124 is operated, driving the air compressor 130 operated thereby causing the air accumulator 122 to receive and accumulate compressed air. The hose 41 conducts the compressed air in the air accumulator 122 to the submersible pump 22 causing the submersible pump 22 to operate. In the alternative, hydraulic fluid under pressure may be used to power the submersible pump 22.

The granular material and debris 146 together with a portion of water 154 held in the basin 140 are thereby pumped by the submersible pump 22 such that a aqueous slurry of granular material and debris 151 is formed and flows from the basin 140 through the input port 23 of the submersible pump 22 into the submersible pump 22 as shown in FIG. 2. The slurry 151 then flows through the output port 24 and into the flexible conduit 26 toward the mobile reservoir means 28.

The slurry of granular material and debris 151 flows through the flexible conduit 26, through the inlet 76, and into the chamber 80 of the mobile reservoir means 28. The turbulent energy of the slurry of granular material and debris 151 is rapidly dissipated in the chamber 80, permitting the granular material and debris 146 to settle toward the outlet 86 at the bottom 29 of the mobile reservoir means 28, and into the first opening 112 of the separation means 30.

The first motor 124 is operated, driving the hydraulic pump (not shown), which in turn powers the hydraulic motor 116. As the hydraulic motor 116 operates, the axle 104 and the spiral conveyor means 110 rotate within the housing 102, and the slurry of granular material and debris 151 is conveyed upwardly along the elongate housing 102 away from the first opening 112 toward the second opening 114. The granular material and debris 149 separate from the water 154, and the granular material and debris 149 continues upwardly until discharged from the second opening 114, while the water 154 drains back toward the first opening 112. Upon discharge from the second opening 114, the removed granular material and debris 149 falls onto the surface of the ground or into the bed of another truck (not shown) for transportation away from the site.

As the water level within the chamber 80 exceeds the level L, the water 154 flows into the weir means 88, through the entry port 94, and into the accumulator means 90 where the water 154 is accumulated without the settled granular material and debris 149. The second motor 128 is operated, driving the second pump 92, causing the water 154 to flow from the accumulator means 90, through the exit port 96, the first flexible pipe 98, the second pump 92, the second flexible pipe 100, and into the basin 140.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for removing granular material and debris from a basin of a body of water containing granular material, debris and water, comprising:

first pump means having an input port and an output port, for collecting through said input port the granular material and debris from of the basin together with a portion of the water contained within the basin;

positioning means having a first end and a second end, said first end being secured to said first pump means for positioning said first pump means within the basin adjacent to the granular material and debris to be removed;

conduit means in fluid tight communication with said output port of said first pump means, said conduit means for conducting the removed granular material, debris and water from said first pump means away from the basin;

mobile reservoir means having an inlet and an outlet, said inlet of said mobile reservoir means being connected to said conduit means for receiving the granular material, debris and water removed from the basin;

separation means having a first opening and a second opening, said first opening being disposed adjacent to and in fluid communication with said outlet of said mobile reservoir means, said separation means extending angularly relative to said mobile reservoir means for conveying the granular material, debris and water away from said first opening toward said second opening, for allowing the water to drain back toward said first opening, for thus separating the granular material and debris from the water, and for conveying the separated granular material and debris toward said second opening for discharge therefrom: and discharge means for discharging the water from said mobile reservoir means back into the basin.

2. An apparatus for removing granular material and debris from a basin as set forth in claim 1, further includes float means floating on the surface of the water contained within the basin for adjustably supporting said first pump means relative to the granular material and debris to be removed.

3. An apparatus for removing granular material and debris from a basin as set forth in claim 2, wherein said second end of said positioning means being secured to said float means, for supporting said positioning means within the basin enabling said first pump means to be positioned adjacent to the granular material and debris to be removed.

4. An apparatus for removing granular material and debris from a basin as set forth in claim 2, wherein said positioning means comprises a rigid member having a first end and a second end, said second end of said rigid member being movably mounted on said float means, said first end of said rigid member being secured to said first pump means for permitting the selective positioning of said first pump means within the basin enabling said first pump means to be positioned adjacent to the granular material and debris to be removed.

5. An apparatus for removing granular material and debris from a basin as set forth in claim 2, wherein said positioning means comprises height control means having a first end and a second end, said second end of said height control means being secured to said float means, said first end of said height control means being secured to said first pump means for permitting the selective control of the depth of said first pump means within the basin enabling said first pump means to be positioned adjacent to the granular material and debris to be removed.

6. An apparatus for removing granular material and debris from a basin as set forth in claim 1, wherein said first pump means is a self-priming submersible pump driven by hydraulic fluid.

7. An apparatus for removing granular material and debris from a basin as set forth in claim 1, wherein the apparatus further includes:
an air accumulator for accumulating compressed air for operating said first pump means;
hose means extending between said air accumulator and said first pump means for supplying compressed air from said air accumulator to said first pump means for operating said first pump means; and
an air compressor for supplying compressed air to said air accumulator.

8. An apparatus for removing granular material and debris from a basin as set forth in claim 1, wherein said conduit means is buoyant.

9. An apparatus for removing granular material and debris from a basin as set forth in claim 1, wherein said mobile reservoir means defines a chamber having opposed sloping sidewalls which slope toward each other from said inlet to said outlet such that as the granular material, debris and water enter said mobile reservoir means through said inlet, turbulent energy of the granular material, debris and water is rapidly dissipated permitting the granular material and debris to settle toward said outlet.

10. An apparatus for removing granular material and debris from a basin as set forth in claim 1, wherein said mobile reservoir means further includes:
a mobile turntable for permitting said mobile reservoir means to be rotated within a substantially horizontal plane such that said inlet of said mobile reservoir means is selectively positioned relative to the basin; and
pivotal means disposed between said mobile turntable and said mobile reservoir means such that said mobile reservoir means is selectively positioned angularly relative to said mobile turntable.

11. An apparatus for removing granular material and debris from a basin as set forth in claim 1, wherein said mobile reservoir means further includes:
weir means extending into said chamber for permitting the level of the slurry within said chamber to be limited;
accumulator means disposed between said weir means and said discharge means for accumulating the water without the granular material and debris, said accumulator means having an entry port and an exit port, said entry port being in fluid communication with said weir means for permitting the slurry to flow from said weir means to said accumulator means;
a first flexible pipe extending between said exit port of said accumulator means and said discharge means; and
a second flexible pipe extending from said discharge means to the basin for enabling slurry to be discharged from said accumulator means back to the basin.

12. An apparatus for removing granular material and debris from a basin as set forth in claim 1, wherein said separation means comprises an Archimedean screw conveyor.

13. An apparatus for removing granular material and debris from a basin as set forth in claim 12, wherein said separation means further includes a hydraulic motor drivingly connected to said Archimedean screw conveyor for rotating said Archimedean screw conveyor.

14. An apparatus for removing granular material and debris from a basin as set forth in claim wherein the apparatus further includes a truck for rotatably supporting said mobile reservoir means and said separation means.

15. An apparatus for removing granular material and debris from a basin as set forth in claim 14, wherein the apparatus further includes support means rigidly secured to said truck for releasably supporting said elongate housing relative to said truck.

16. An apparatus for removing granular material and debris from a basin as set forth in claim 1, wherein said discharge means comprises a second pump in fluid communication with said mobile reservoir means for pumping the water from said mobile reservoir means back to the basin.

17. An apparatus for removing granular material and debris from a basin of a body of water containing granular material, debris and water, the apparatus comprising:
first pump means having an input port and an output port, for collecting through said input port the granular material and debris from of the basin together with a portion of the water contained within the basin;
positioning means having a first end and a second end, said second end being secured to said first pump means for positioning said first pump means within the basin adjacent to the granular material and debris to be removed;
conduit means in fluid tight communication with said output port of said first pump means, said conduit means for conducting the removed granular material, debris and water from said first pump means away from the basin;

mobile reservoir means having an inlet and an outlet, said inlet of said mobile reservoir means being connected to said conduit means for receiving the granular material, debris and water removed from the basin flows into said mobile reservoir means;

said mobile reservoir means defining a chamber having opposed sloping sidewalls which slope toward each other from said inlet to said outlet such that as the granular material, debris and water enter said mobile reservoir means through said inlet, turbulent energy of the granular material, debris and water is rapidly dissipated permitting the granular material and debris to settle toward said outlet;

an Archimedean screw conveyor for separating the granular material and debris from the water, said Archimedean screw conveyor further including:

an elongate housing defining a first opening and second opening, said first opening being disposed adjacent to and in fluid communication with said outlet of said mobile reservoir means, and said elongate housing extending angularly relative to said mobile reservoir means;

an elongate axle rotatably supported by and extending through and along the length of said elongate housing, said elongate axle having a first end and a second end, said first end of said elongate axle being disposed adjacent to said outlet of said mobile reservoir means;

spiral conveyor means rigidly secured to said elongate axle, said spiral conveyor means being disposed within said elongate housing and extending between said first opening and said second opening of said elongate housing such that when said elongate axle and spiral conveyor means rotate within said elongate housing, granular material, debris and water are conveyed upwardly along said elongate housing from said first opening toward said second opening, the granular material and debris continuing upwardly until discharged from said second opening and the water separating and flowing downwardly along said elongate housing toward said first opening; and a second pump in fluid communication with said mobile reservoir means for pumping the water from said mobile reservoir means back to the basin.

18. An apparatus for removing granular material and debris from a basin as set forth in claim 17, wherein said elongate housing is disposed at an angle of substantially 18° to the horizontal.

19. A method of removing granular material and debris from a basin of a body of water, using first pump means having an input port and an output port, conduit means, mobile reservoir means having an inlet and an outlet, separation means having a first opening and a second opening, and comprising the steps of:

connecting conduit means in fluid tight communication with the output port of the first pump means;

connecting the conduit means to the inlet of the mobile reservoir means;

positioning the input port of the first pump means proximate the granular material and debris within the basin for collecting the granular material, debris and a portion of the water contained within the basin;

pumping the granular material, debris and the portion of water from the basin by the first pump means such that a slurry of granular material and debris is formed and flows from the basin through the first pump means and the conduit means toward the mobile reservoir means;

settling the granular material and debris within the mobile reservoir means such that the granular material and debris settle toward an outlet of the mobile reservoir means, the outlet being in fluid communication with a first opening of a separation means;

separating the granular material and debris from the water such that the separated granular material and debris is conveyed angularly relative to the mobile reservoir means thereby permitting the water and granular material and debris to be conveyed away from the first opening of the separation means toward a second opening of the separation means, so that the water drains back toward the first opening and the granular material and debris is separated from the water and conveyed toward the second opening for discharge therefrom;

discharging the water from the mobile reservoir means back into the basin; and discharging the granular material and debris from the second opening of the separation means.

20. The method of claim 19, using an Archimedean screw conveyor, and further comprising the steps of:

separating the granular material and debris from the water such that the separated granular material and debris is conveyed angularly relative the mobile reservoir means by the Archimedean screw conveyor thereby permitting the water and granular material and debris to be conveyed away from a first opening of an elongate housing toward a second opening of the elongate housing, such that the water drains back toward the first opening and the granular material and debris is separated from the water and conveyed toward the second opening for discharge therefrom.

* * * * *

UNITED STATES PATENT AND TRADEMARK OFFICE
CERTIFICATE OF CORRECTION

PATENT NO. : 5,167,841
DATED : December 1, 1992
INVENTOR(S) : Ken Mims

It is certified that error appears in the above-identified patent and that said Letters Patent is hereby corrected as shown below:

Column 3, line 58, delete "alone" and insert therefor --along--.

Column 10

Claim 14, line 34, after "claim" insert --1--.

Signed and Sealed this

Twenty-sixth Day of October, 1993

*Attest:*

BRUCE LEHMAN

*Attesting Officer*    *Commissioner of Patents and Trademarks*